(12) United States Patent
Sigrist

(10) Patent No.: US 6,682,051 B2
(45) Date of Patent: Jan. 27, 2004

(54) WIRE GUIDE SYSTEM

(75) Inventor: Peter C. Sigrist, 17229 NE. 6th Pl., Bellevue, WA (US) 98008

(73) Assignee: Peter C. Sigrist, Bellevue, WA (US)

( * ) Notice: Subject to any disclaimer, the term of this patent is extended or adjusted under 35 U.S.C. 154(b) by 0 days.

(21) Appl. No.: 10/178,312

(22) Filed: Jun. 20, 2002

(65) Prior Publication Data

US 2003/0234388 A1 Dec. 25, 2003

(51) Int. Cl.[7] .............................................. B65H 59/00
(52) U.S. Cl. ........................ 254/134.3 R; 254/134; 254/3 FT
(58) Field of Search ............................. 254/134.3 FT, 254/134.3 R, 390, 415, 413; 174/66; 220/3.2, 3.5; 226/179, 180, 194; 248/63, 231.1, 291

(56) References Cited

U.S. PATENT DOCUMENTS

| | | | |
|---|---|---|---|
| 458,855 A | 9/1891 | Meinzer | |
| 2,515,724 A | 7/1950 | McGroskey | |
| 3,005,620 A | 10/1961 | Trunnell | |
| 4,132,665 A | 1/1979 | Nelson | |
| 4,358,089 A | * 11/1982 | Metcalf | 254/134.3 FT |
| 4,896,784 A | * 1/1990 | Heath | 220/3.2 |
| 4,951,923 A | 8/1990 | Couture | |
| 5,236,177 A | 8/1993 | Tamm | |
| 5,271,605 A | * 12/1993 | Damron | 254/134.3 FT |
| 6,476,327 B1 | * 11/2002 | Bernard et al. | 174/101 |

* cited by examiner

Primary Examiner—Robert C. Watson

(57) ABSTRACT

A wire guide system for facilitating efficient installation of wire within conduit connected to an electrical box. The wire guide system includes a main body having main cutout, the main cutout having an upper curved portion and a lower curved portion for receiving a length of wire, a plurality of extended portions, and a plurality of leg members attached to the extended portions for engaging an inner corner lip of an electrical box. The main body has a generally spherical structure for facilitating receiving and redirecting of the wire as the wire is pulled through the electrical box into a connected conduit. The upper curved portion and the lower curved portion preferably have a relatively consistent radius of curvature for smoothly guiding the wire.

20 Claims, 11 Drawing Sheets

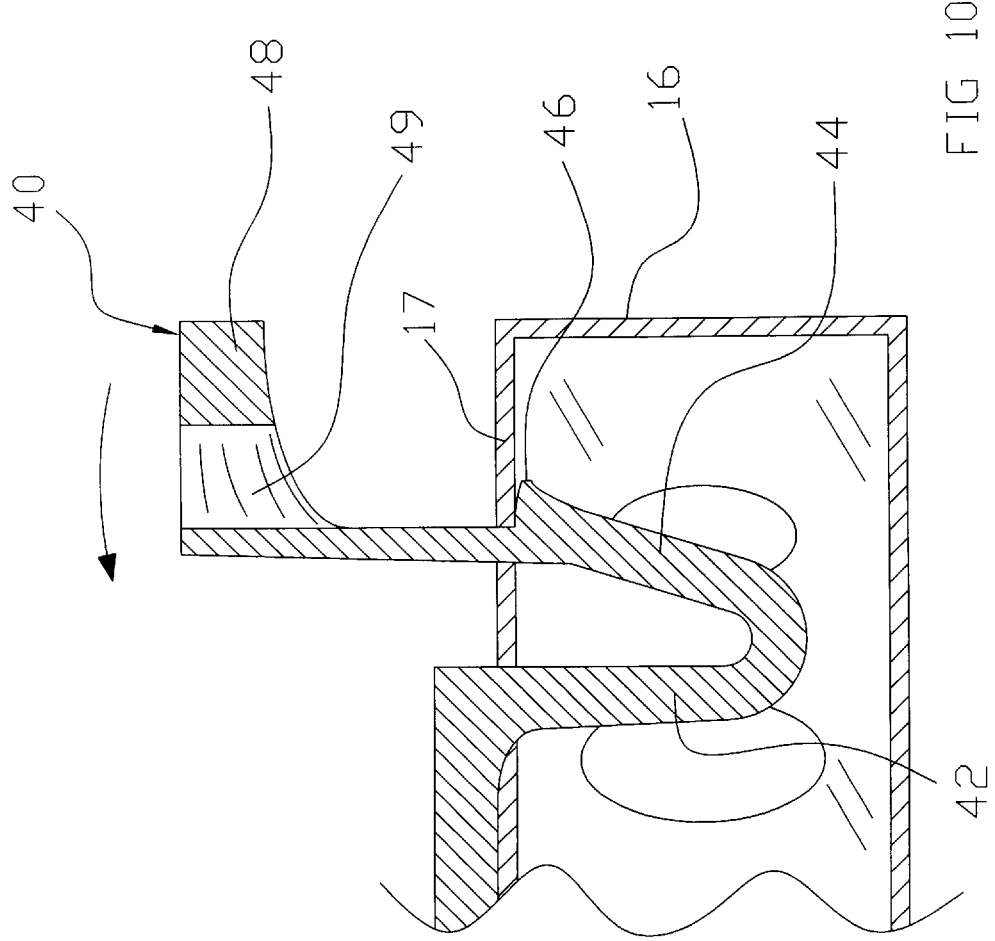

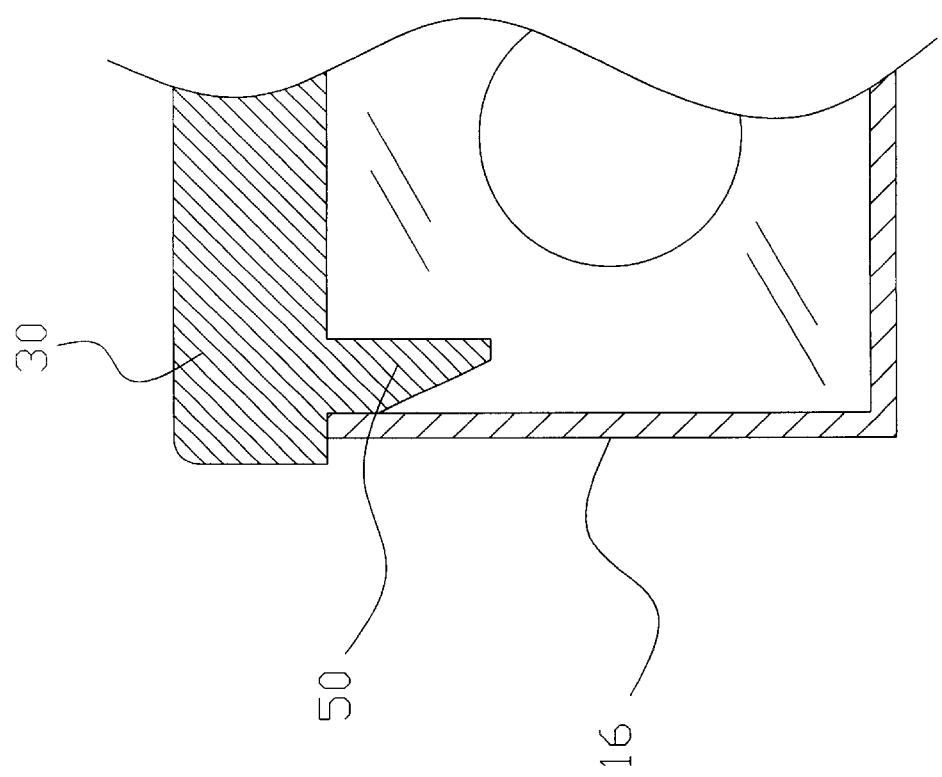

WIRE GUIDE SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND OF THE INVENTION.

1. Field of the Invention

The present invention relates generally to wire guides and more specifically it relates to a wire guide system for facilitating efficient installation of wire within conduit connected to an electrical box.

2. Description of the Related Art

Wire installation devices have been in use for years. The most commonly utilized wire installation device utilized is commonly referred to as "fish tape" which is a resilient elongate metal cable that is inserted through conduit and then attached to a wire to be pulled through the conduit.

The main problem with utilizing fish tape is that when pulling wire through a electrical box the wire often times binds or is damaged upon the electrical. Electrical boxes typically have sharp metal edges which do not facilitate easy movement of the wire. Another problem with utilizing fish tape is that two workers are often times required wherein one worker assists in guiding the wire through the electrical box into a conduit while the second worker pulls the fish tape through the conduit.

Examples of patented devices which may be related to the present invention include U.S. Pat. No. 458,855 to Meinzer; U.S. Pat. No. 5,236,177 to Tamm; U.S. Pat. No. 4,951,923 to Couture; U.S. Pat. No. 4,132,665 to Nelson; U.S. Pat. No. 3,005,620 to Trunnell; and U.S. Pat. No. 2,515,724 to McCroskey.

While these devices may be suitable for the particular purpose to which they address, they are not as suitable for facilitating efficient installation of wire within conduit connected to an electrical box. Conventional fish tape utilized alone dose not provide for efficient installation of wire when pulled through an electrical box.

In these respects, the wire guide system according to the present invention substantially departs from the conventional concepts and designs of the prior art, and in so doing provides an apparatus primarily developed for the purpose of facilitating efficient installation of wire within conduit connected to an electrical box.

BRIEF SUMMARY OF THE INVENTION

In view of the foregoing disadvantages inherent in the known types of wire guide devices now present in the prior art, the present invention provides a new wire guide system construction wherein the same can be utilized for facilitating efficient installation of wire within conduit connected to an electrical box.

The general purpose of the present invention, which will be described subsequently in greater detail, is to provide a new wire guide system that has many of the advantages of the wire guide systems mentioned heretofore and many novel features that result in a new wire guide system which is not anticipated, rendered obvious, suggested, or even implied by any of the prior art wire guide devices, either alone or in any combination thereof.

To attain this, the present invention generally comprises a main body having main cutout, the main cutout having an upper curved portion and a lower curved portion for receiving a length of wire, a plurality of extended portions, and a plurality of leg members attached to the extended portions for engaging an inner corner lip of an electrical box. The main body has a generally spherical structure for facilitating receiving and redirecting of the wire as the wire is pulled through the electrical box into a connected conduit. The upper curved portion and the lower curved portion preferably have a relatively consistent radius of curvature for smoothly guiding the wire.

There has thus been outlined, rather broadly, the more important features of the invention in order that the detailed description thereof may be better understood, and in order that the present contribution to the art may be better appreciated. There are additional features of the invention that will be described hereinafter and that will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a wire guide system that will overcome the shortcomings of the prior art devices.

A second object is to provide a wire guide system for facilitating efficient installation of wire within conduit connected to an electrical box.

Another object is to provide a wire guide system that reduces the amount of labor and time required to pull wire through an electrical box.

An additional object is to provide a wire guide system that allows one person to pull wire through an electrical box.

A further object is to provide a wire guide system that may be utilized upon various types of electrical boxes.

Another object is to provide a wire guide system that reduces damage to wire being pulled through an electrical box.

A further object is to provide a wire guide system that reduces wire kinking at the conduit entrance.

Another object is to provide a wire guide system that may be utilized upon various elongate objects such as but not limited to electrical wire, fiber-optic cable and other elongate objects.

Other objects and advantages of the present invention will become obvious to the reader and it is intended that these objects and advantages are within the scope of the present invention.

To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein:

FIG. 10 is a magnified side cutaway view of the engaging lip engaging the inner corner lip.

FIG. 11 is a magnified side cutaway view of a clip member engaging an inner surface wall of the electrical box.

DETAILED DESCRIPTION OF THE INVENTION

Figure 1:
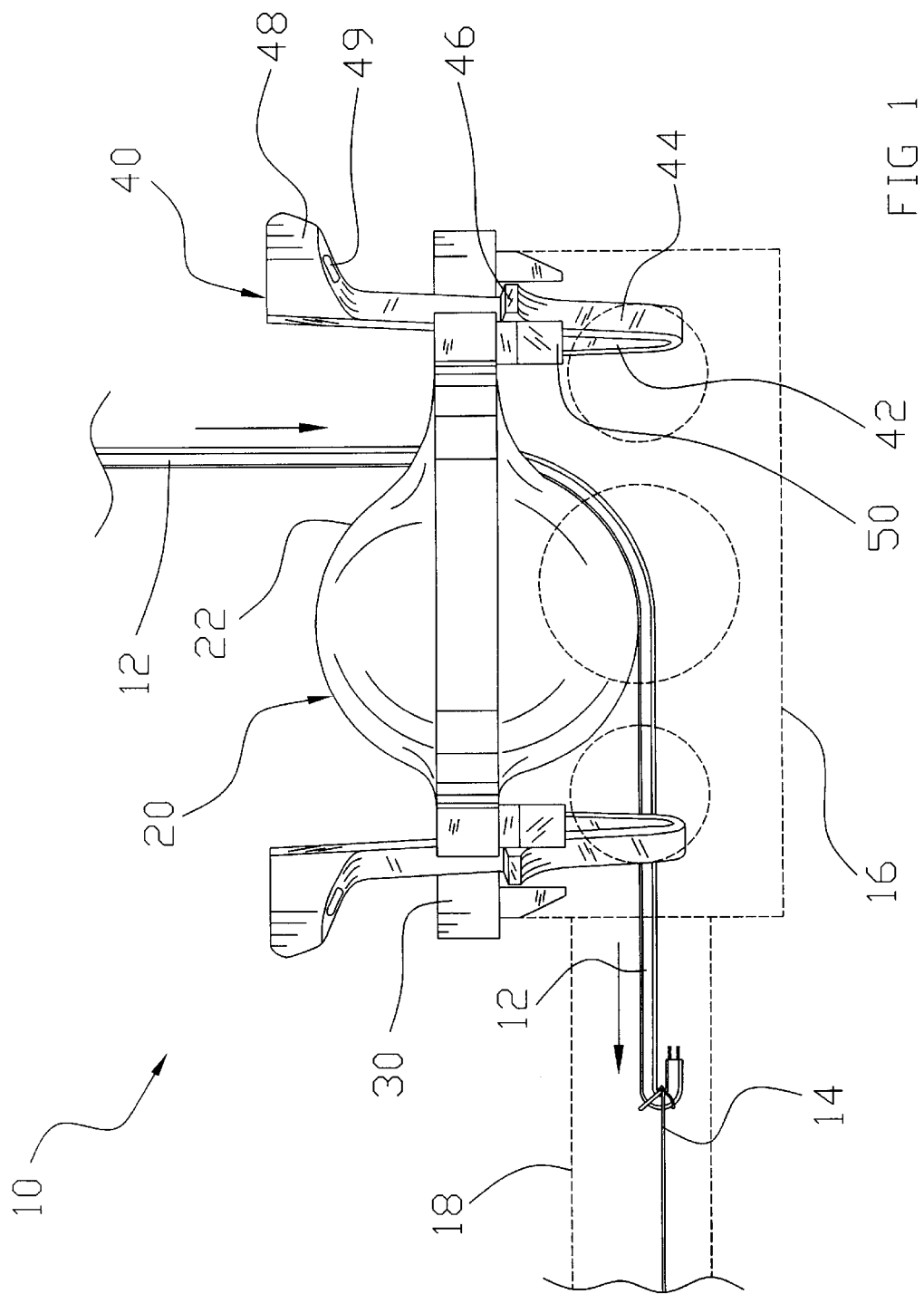
FIG. 1 is a side view of the present invention with a wire being drawn into a conduit through an electrical box.

Turning now descriptively to the drawings, in which similar reference characters denote similar elements throughout the several views, FIGS. 1 through 11 illustrate a wire guide system 10, which comprises a main body 20 having main cutout, the main cutout having an upper curved portion 22 and a lower curved portion 24 for receiving a length of wire 12, a plurality of extended portions 30, and a plurality of leg members 40 attached to the extended portions 30 for engaging an inner corner lip 17 of an electrical box 16. The main body 20 has a generally spherical structure for facilitating receiving and redirecting of the wire 12 as the wire 12 is pulled through the electrical box 16 into a connected conduit 18. The upper curved portion 22 and the lower curved portion 24 preferably have a relatively consistent radius of curvature for smoothly guiding the wire 12.

As shown in FIG. 1 of the drawings, the main body 20 has a generally spherical structure. The main body 20 may have various other general shapes that may be utilized to accomplish similar purposes and functions. The main body 20 is preferably constructed of a low resistance material for facilitating sliding of wire 12 along the main body 20 such as but not limited to plastic or composite material.

Figure 2:
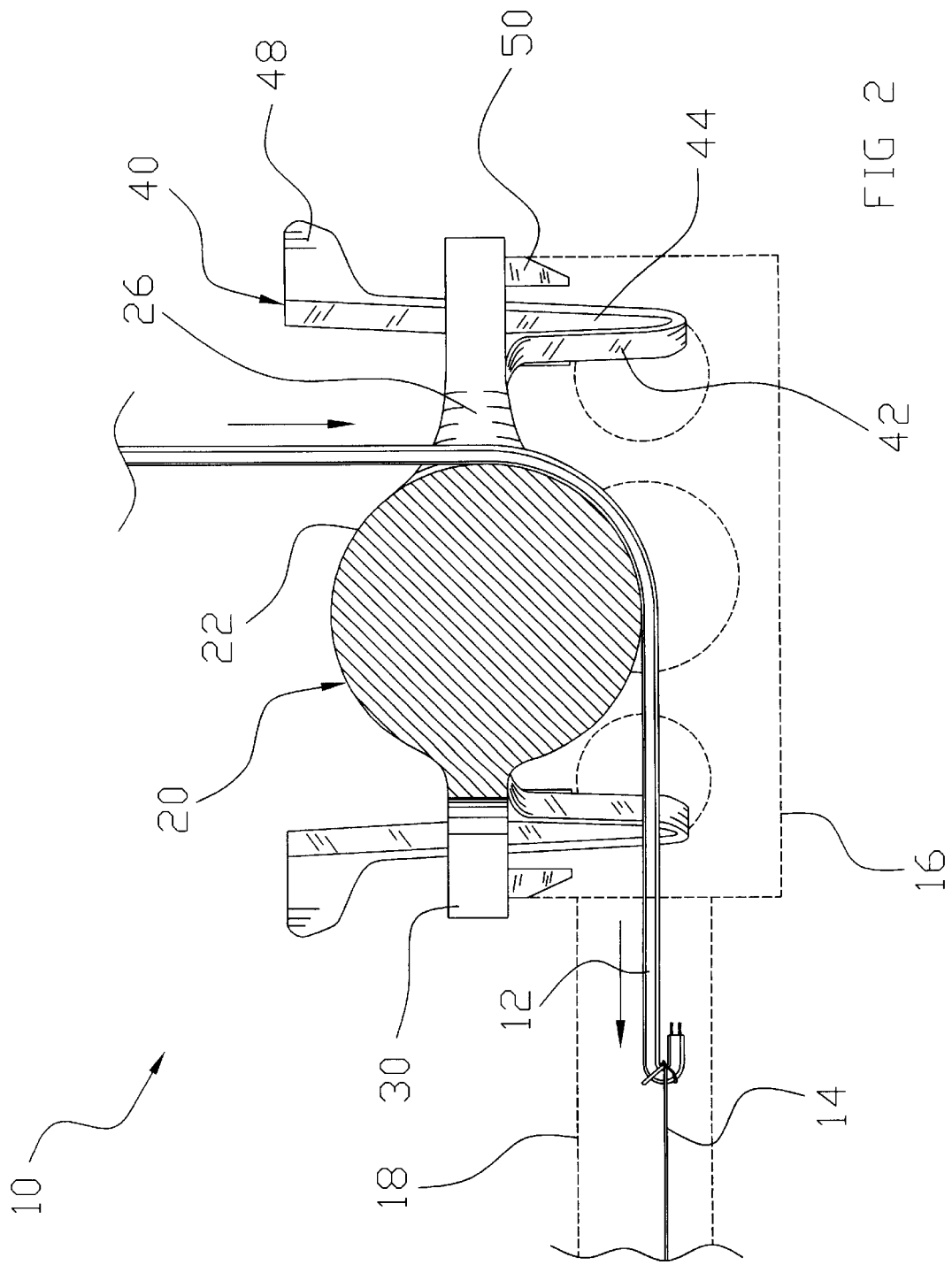
FIG. 2 is a side cutaway view of FIG. 1.
Figure 3:
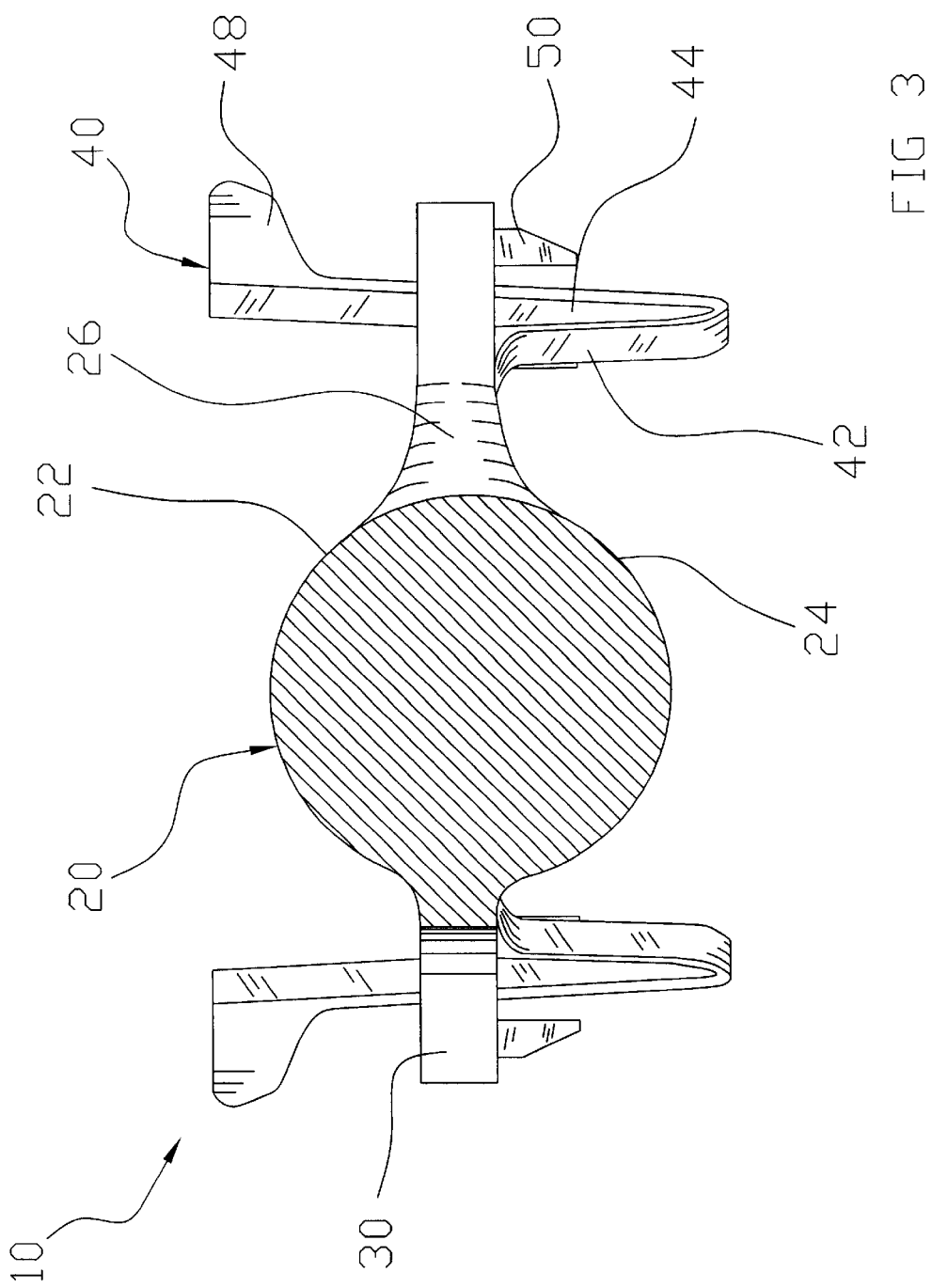
FIG. 3 is a cross sectional view taken along line 3—3 of FIG. 4.

As best shown in FIGS. 3, 4, 6 and 8 of the drawings, the main body 20 has a main cutout comprised of an upper curved portion 22 and a lower curved portion 24. The upper curved portion 22 receives the wire 12 initially and guides the wire 12 along the main body 20 onto the lower curved portion 24 which guides the wire 12 into the desired conduit 18 connected to the electrical box 16 as shown in FIGS. 1 and 2 of the drawings. The upper curved portion 22 and the lower curved portion 24 have a radius of curvature that is transverse to the radius of curvature of the main body 20. The curved portions 22, 24 are preferably comprised of a consistent radius of curvature that is similar to the main body 20 as best shown in FIG. 3 of the drawings. The curved portions 22, 24 have a generally U-shaped structure for receiving various sizes and type of cable and other elongate material.

Figure 4:
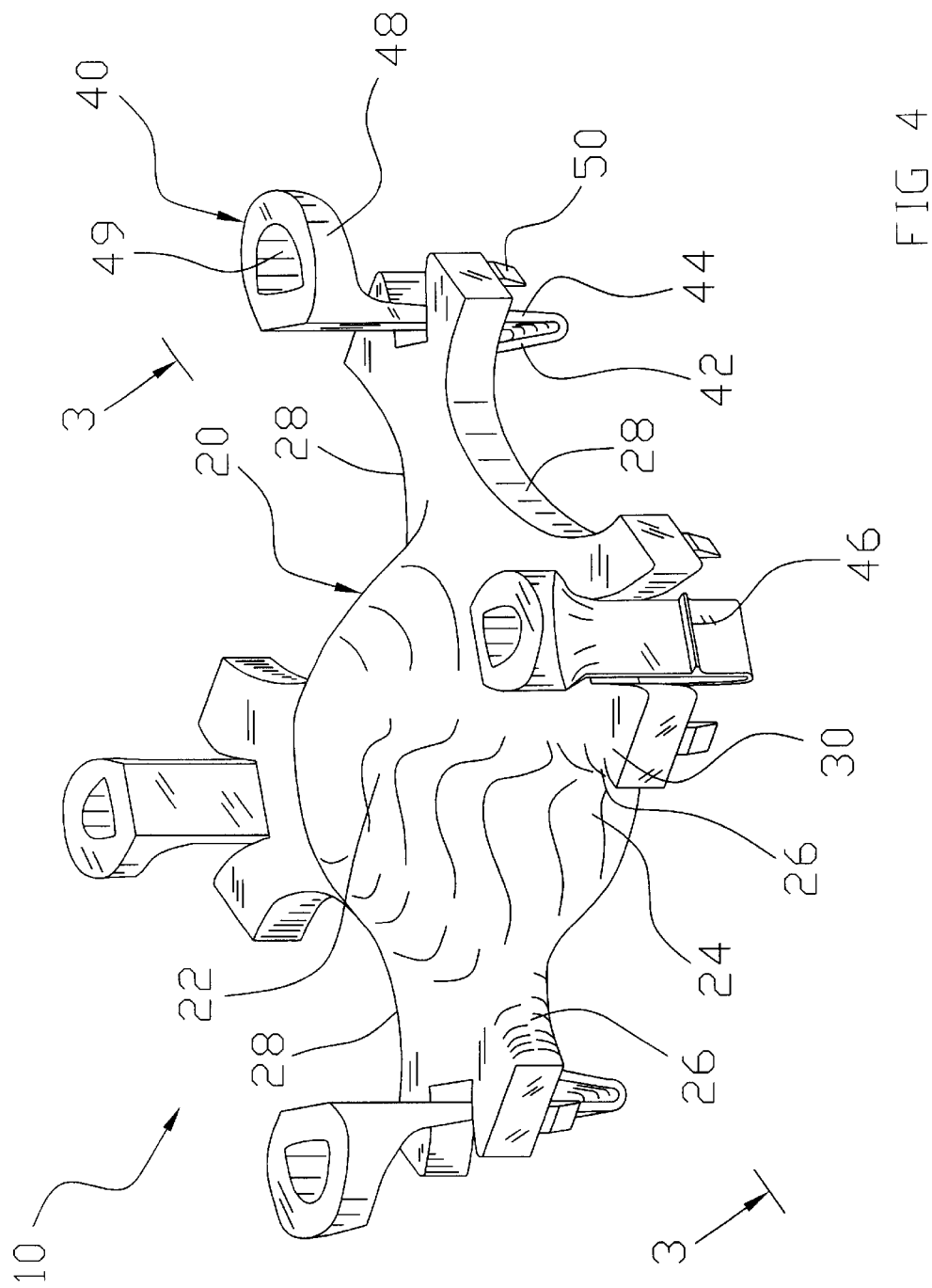
FIG. 4 is an upper perspective view of the present invention.
Figure 5:
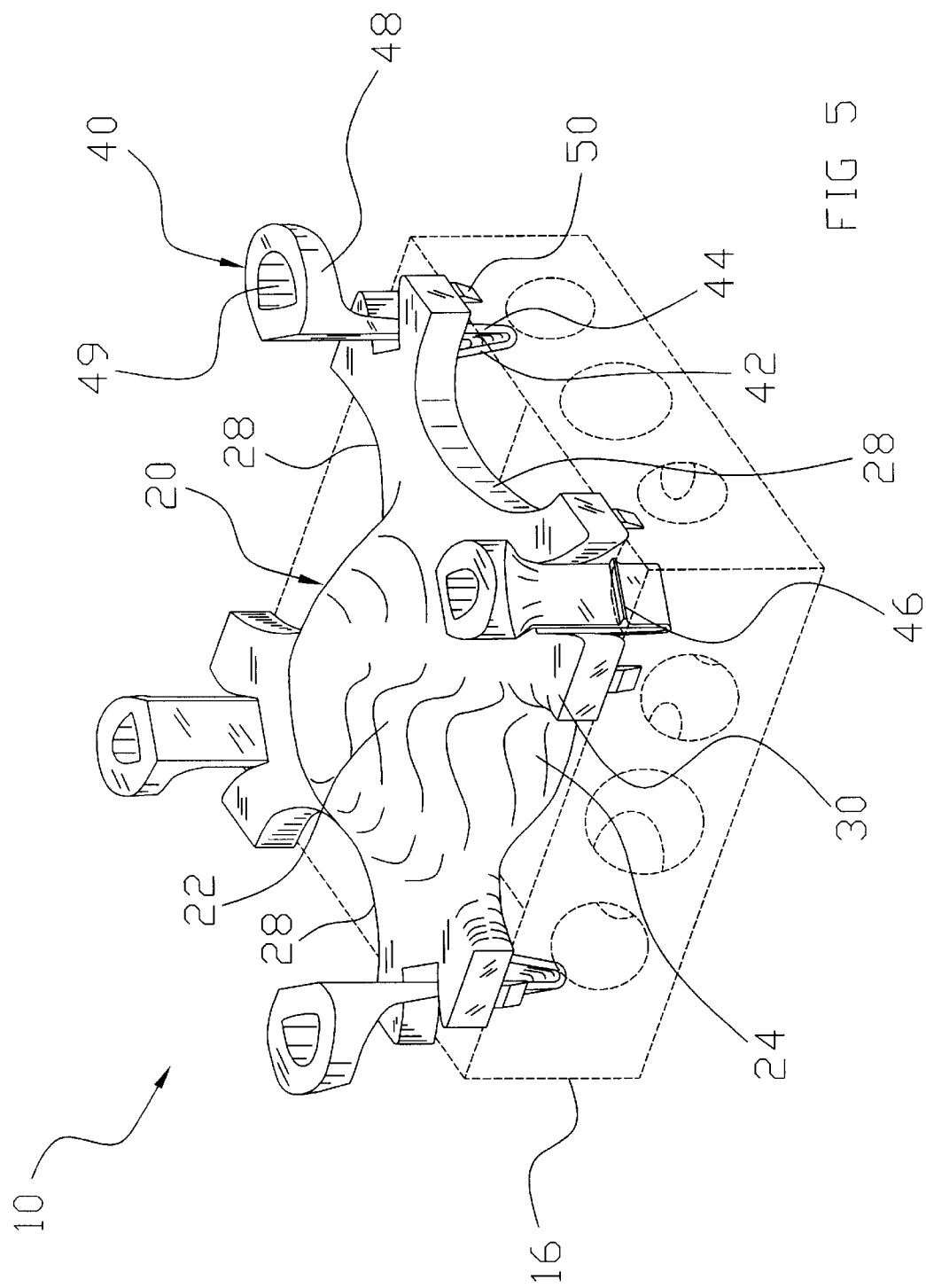
FIG. 5 is an upper perspective view of the present invention attached within an electrical box.
Figure 6:
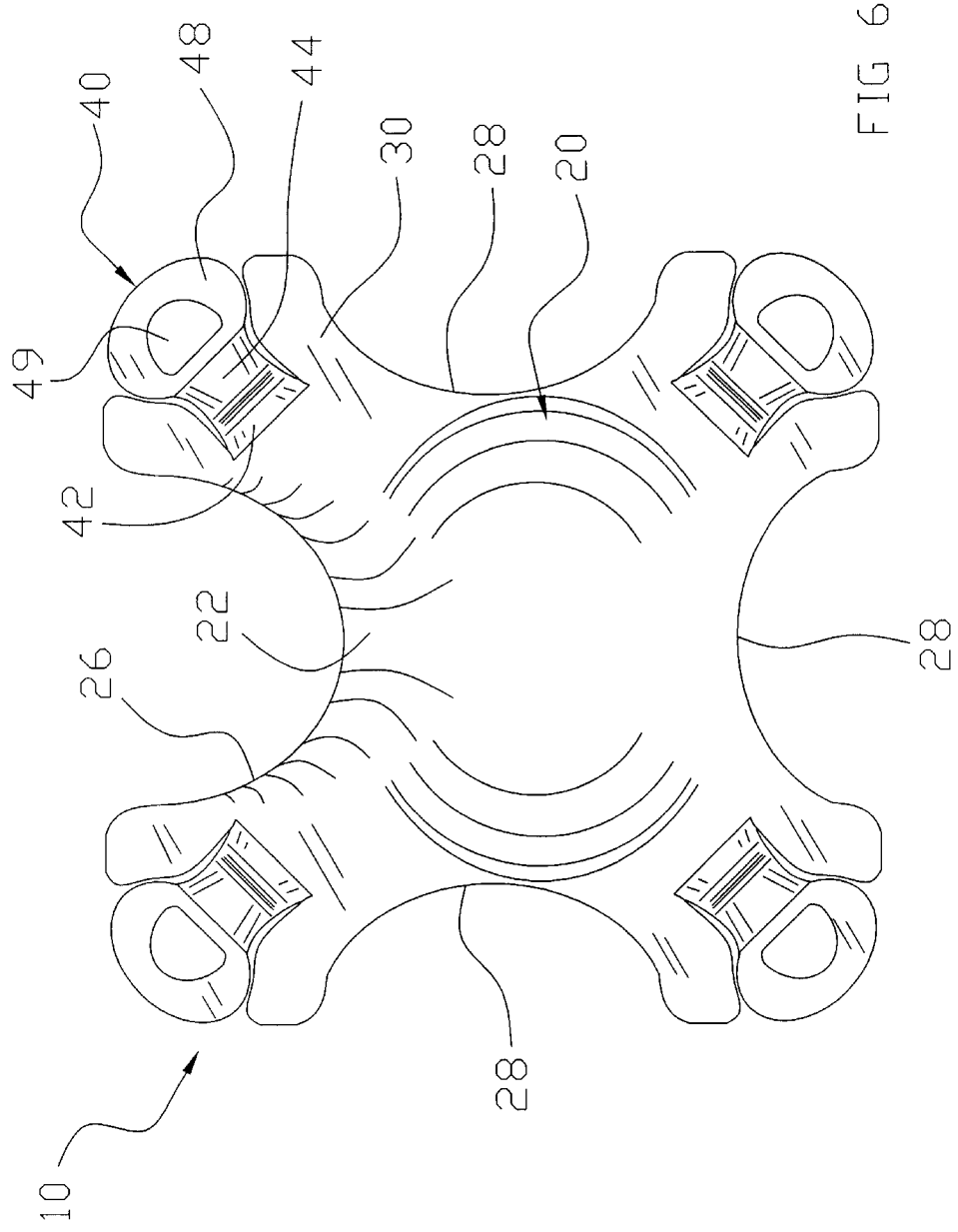
FIG. 6 is a top view of the present invention.
Figure 7:
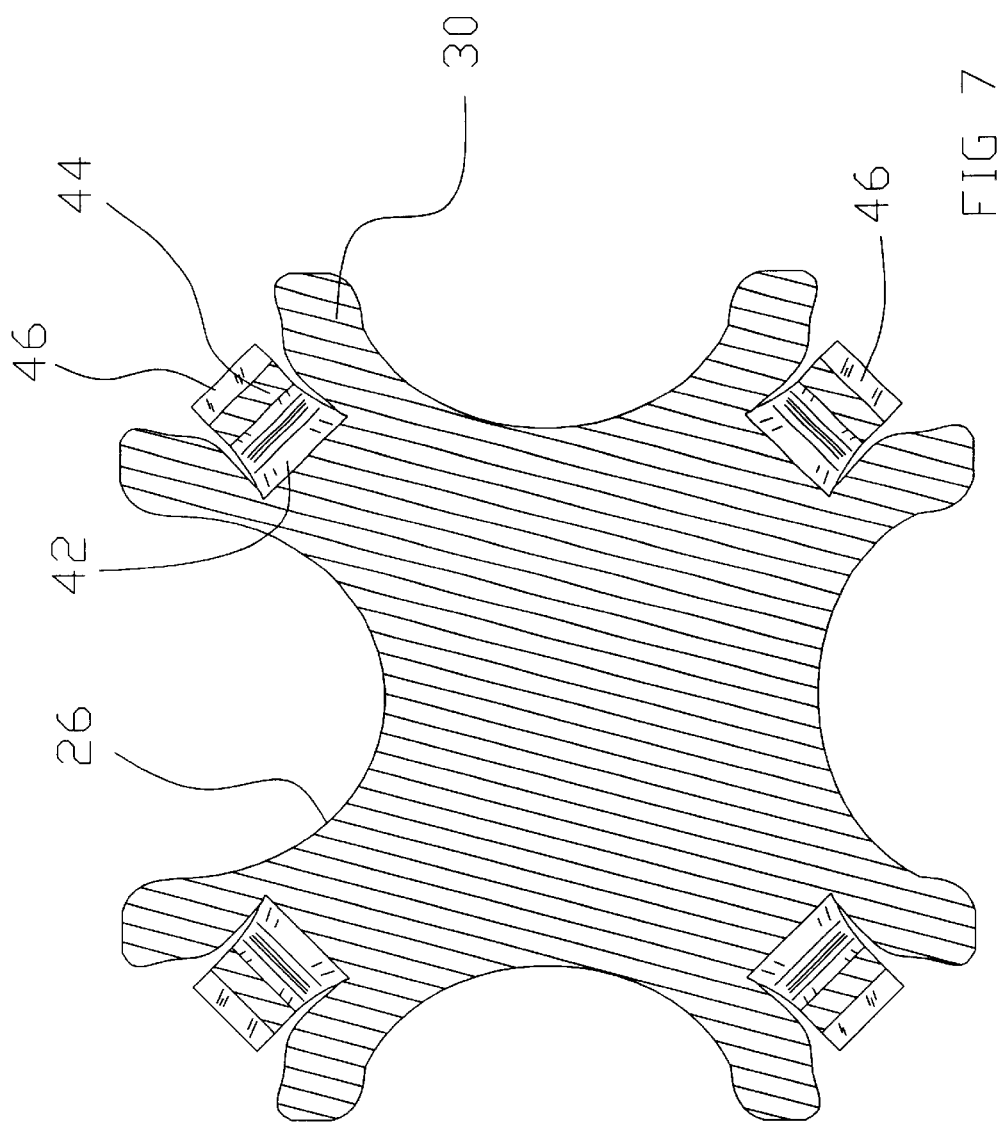
FIG. 7 is a cross sectional view taken along line 7—7 of FIG. 9.
Figure 8:
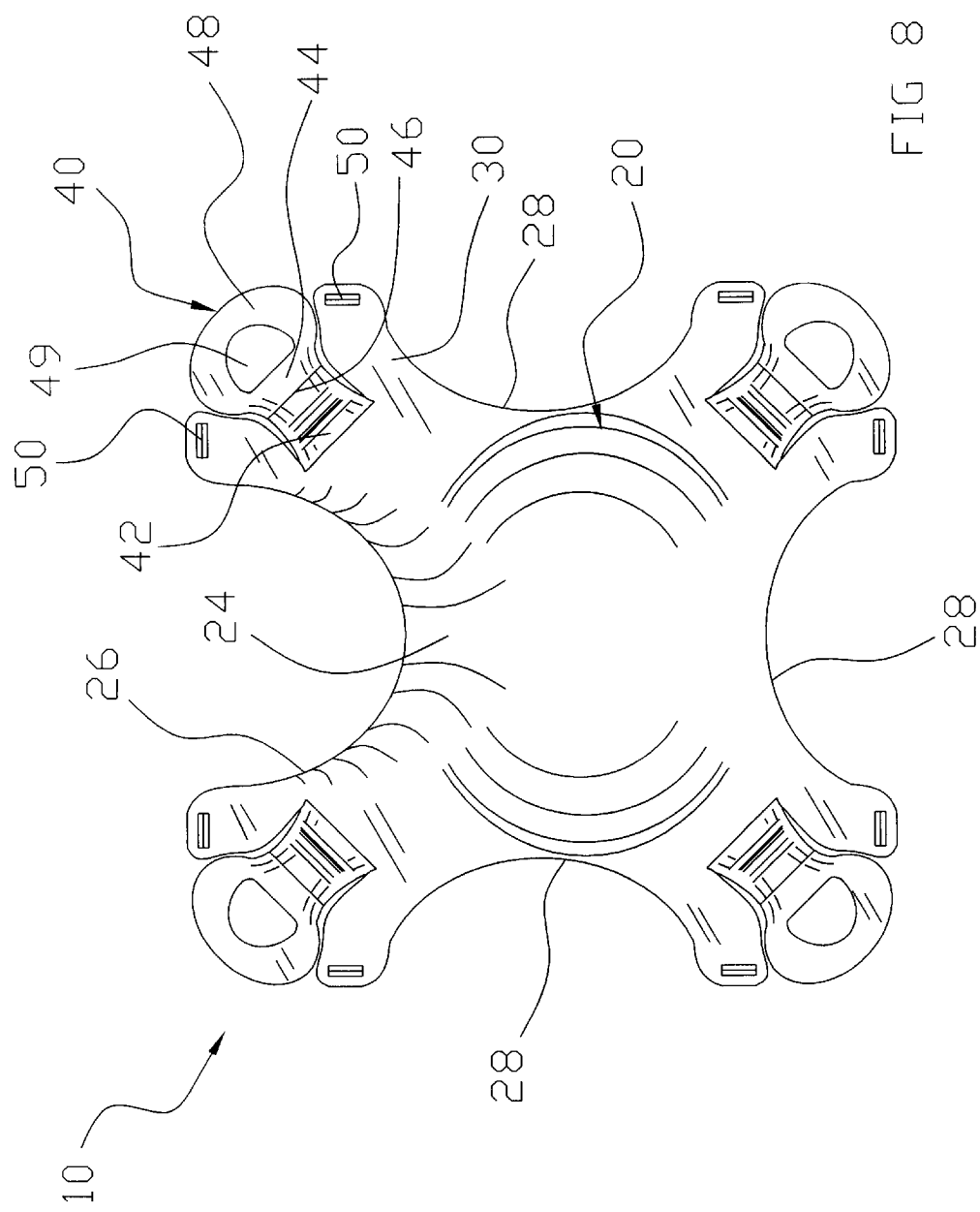
FIG. 8 is a bottom view of the present invention.
Figure 9:
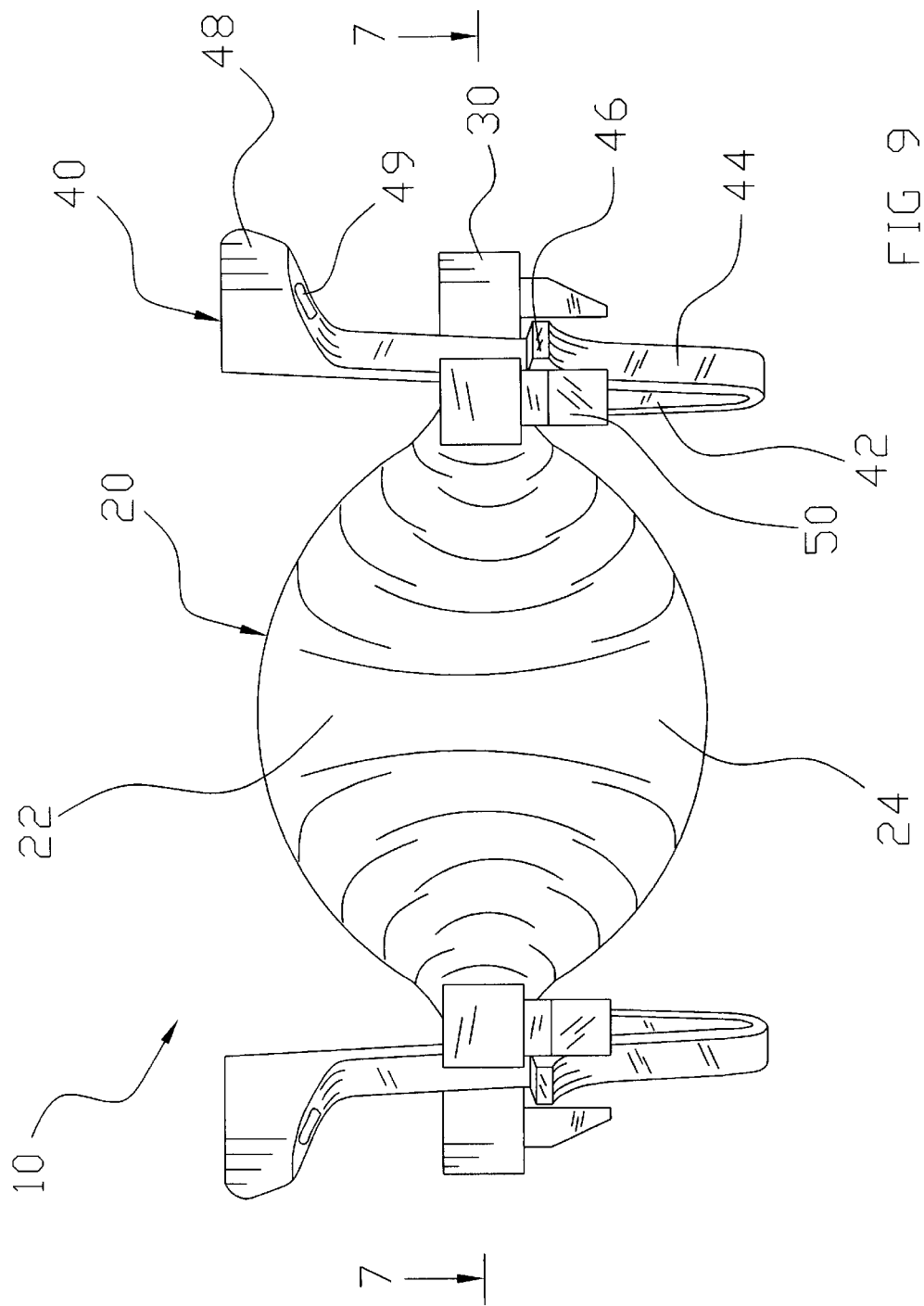
FIG. 9 is a front view of the present invention illustrating the upper and lower curved portions of the main cutout.

As best shown in FIGS. 6 and 8 of the drawings, a plurality of extended portions 30 extend outwardly from the main body 20. Preferably, four extended portions 30 are utilized which correspond to inner corner lips 17 of the electrical box 16 as best illustrated in FIG. 5 of the drawings. Two of the extended portion extend about the opposing sides of the curved portions 22, 24 of the main body 20 as best illustrated in FIGS. 6 through 8 of the drawings. A side curved portion 26 extends from opposing sides of the curved portions 22, 24 to along a portion of the extended portions 30 surrounding the curved portions 22, 24 for facilitating movement of the wire 12 about the main body 20 as best illustrated in FIG. 4 of the drawings.

As best shown in FIG. 6 of the drawings, three auxiliary cutouts 28 are formed by the extended portions 30 which allow existing cable within the electrical box 16 to be extended through thereby reducing interference with the installation of new wire 12. The auxiliary cutouts 28 may have various shapes and sizes as can be appreciated. It can also be appreciated that the present invention may be formed without the usage of the auxiliary cutouts 28.

Each of the extended portions 30 preferably has a slot wherein the leg members 40 extend from within as shown in FIGS. 4 through 8 of the drawings. Each of the leg members 40 has a first leg 42 extending downwardly a finite distance and a second leg 44 attached to the distal end of the first leg 42 extending upwardly thereby forming a V-shaped structure as best shown in FIG. 10 of the drawings. Each of the leg members 40 are comprised of a resilient material for allowing the second leg 44 to move with respect to the first leg 42 for installation and removal of the present invention within an electrical box 16.

Each of the leg member preferably includes an upper body 48 that has an aperture 49 within. An individual may extend a fastener through the aperture 49 into the corresponding hole within the electrical box 16 for securing the present invention to the electrical box 16 if desired (not required).

As best shown in FIGS. 4, 5, 9 and 10 of the drawings, each of the leg members 40 includes an engaging lip 46 extending outwardly from the second leg 44. The engaging lip 46 is formed for selectively and catchably engaging the corresponding inner corner lip 17 of the electrical box 16 as further shown in FIG. 10 of the drawings.

As shown in FIGS. 4, 5 and 11 of the drawings, a plurality of clip members are attached to the distal portions of the extended portions 30 for engaging the interior edge of the electrical box 16. The clip members are preferably attached in pairs about each of the leg members 40 as best shown in FIG. 8 of the drawings. Each of the clip members preferably includes a tapered lower portion for providing guidance when installed upon the electrical box 16 as best shown in FIG. 11 of the drawings.

In use, the user positions the present invention within the interior portion of the electrical box 16 as illustrated in FIGS. 1, 2, 3 and 5 of the drawings. The user positions the main cutout comprised of the curved portions 22, 24 to face in a direction opposite of the conduit 18 wherein the wire 12 is to be fed into as illustrated in FIGS. 1 and 2 of the drawings. The user ensures that the engaging lip 46 of each of the leg members 40 is catchably retained upon the corresponding inner corner lip 17 of the electrical box 16. The user may also position any existing cable within the electrical box 16 outwardly through the auxiliary cutouts 28 to avoid interference with the wire 12 to be drawn into the conduit 18. The user then draws the wire 12 with the fish tape 14 about the main cutout through the electrical box 16 and into the conduit 18 as best illustrated in FIGS. 1 and 2 of the drawings. As the wire 12 passes from the upper curved portion 22 to the lower curved portion 24, the wire 12 is curved along the main cutout to become approximately aligned with the conduit 18 as further shown in FIGS. 1 and 2 of the drawings. The user continues to draw the wire 12 through the conduit 18 until the desired length has been installed. The user then cuts the wire 12 and then removes the present invention from the electrical box 16.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed to be within the expertise of those skilled in the art, and all equivalent structural variations and relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A wire guide system, comprising:
   a main body having a main cutout, wherein a pair of side curved portions are within opposing sides of said main cutout and wherein said main cutout receives a length of material to be guided;
   a plurality of extended portions extending from said main body; and
   a plurality of leg members attached to said extend portions for selectively engaging a corresponding inner corner lip of an electrical box.

2. The wire guide system of claim 1, wherein said leg members each are comprised of a first leg extending downwardly and a second leg attached to the first leg extending upwardly.

3. The wire guide system of claim 2, including an engaging lip attached to each second leg.

4. The wire guide system of claim 3, wherein said leg members each include an upper body attached to the distal portion of said second leg.

5. The wire guide system of claim 4, wherein said upper body includes an aperture.

6. The wire guide system of claim 1, wherein each of said extended portions includes a slot for receiving said leg members.

7. The wire guide system of claim 1, wherein said main cutout is comprised of an upper curved portion and a lower curved portion.

8. The wire guide system of claim 7, wherein said upper curved portion and said lower curved portion have approximately the same radius of curvature.

9. The wire guide system of claim 1, including a plurality of auxiliary cutouts within said main body.

10. A wire guide system, comprising:
    a main body having a main cutout, wherein a pair of side curved portions are within opposing sides of said main cutout and wherein said main cutout receives a length of material to be guided;
    a plurality of extended portions extending from said main body;
    a plurality of leg members attached to said extend portions for selectively engaging a corresponding inner corner lip of an electrical box; and
    a plurality of clip members extending from said extended portions to engage an interior surface of said electrical box.

11. The wire guide system of claim 10, wherein said leg members each are comprised of a first leg extending downwardly and a second leg attached to the first leg extending upwardly.

12. The wire guide system of claim 11, including an engaging lip attached to each second leg.

13. The wire guide system of claim 12, wherein said leg members each include an upper body attached to the distal portion of said second leg.

14. The wire guide system of claim 13, wherein said upper body includes an aperture.

15. The wire guide system of claim 10, wherein each of said extended portions includes a slot for receiving said leg members.

16. The wire guide system of claim 10, wherein said main cutout is comprised of an upper curved portion and a lower curved portion.

17. The wire guide system of claim 16, wherein said upper curved portion and said lower curved portion have approximately the same radius of curvature.

18. The wire guide system of claim 10, wherein said main body has a generally spherical structure.

19. A wire guide system, comprising:
    a main body having a main cutout, wherein said main cutout receives a length of material to be guided;
    a plurality of extended portions extending from said main body; and
    a plurality of leg members attached to said extend portions for selectively engaging a corresponding inner corner lip of an electrical box, wherein said leg members each are comprised of a first leg extending downwardly and a second leg attached to the first leg extending upwardly.

20. The wire guide system of claim 19, including an engaging lip attached to each second leg.

* * * * *